(12) United States Patent
Chandran et al.

(10) Patent No.: US 11,025,500 B2
(45) Date of Patent: Jun. 1, 2021

(54) PROVISIONING INFRASTRUCTURE FROM VISUAL DIAGRAMS

(71) Applicant: INTERNATIONAL BUSINESS MACHINES CORPORATION, Armonk, NY (US)

(72) Inventors: Vysakh K. Chandran, Thrissur (IN); Debasisha Padhi, Bangalore (IN); Souri Subudhi, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/514,520

(22) Filed: Jul. 17, 2019

(65) Prior Publication Data

US 2021/0021479 A1    Jan. 21, 2021

(51) Int. Cl.
| | |
|---|---|
| *G06F 15/173* | (2006.01) |
| *H04L 12/24* | (2006.01) |
| *G06N 3/08* | (2006.01) |
| *G06N 3/04* | (2006.01) |

(52) U.S. Cl.
CPC ......... *H04L 41/145* (2013.01); *G06N 3/0454* (2013.01); *G06N 3/08* (2013.01); *H04L 41/16* (2013.01); *H04L 41/22* (2013.01)

(58) Field of Classification Search
CPC ....... H04L 41/145; H04L 41/22; H04L 41/16; G06N 3/0434; G06N 3/08
USPC ................................ 709/202–203, 223–224
See application file for complete search history.

(56) References Cited

U.S. PATENT DOCUMENTS

| | | |
|---|---|---|
| 7,676,552 B2 | 3/2010 | Eilam et al. |
| 9,218,205 B2 | 12/2015 | MacDonald |
| 2005/0177600 A1 | 8/2005 | Eilam et al. |

(Continued)

OTHER PUBLICATIONS

Kirschnick, J. et al., "Toward an architecture for the automated provisioning of cloud services," In IEEE Communications Magazine, Dec. 1, 2010, vol. 48, No. 12, pp. 124-131.

(Continued)

*Primary Examiner* — Bharat Barot
(74) *Attorney, Agent, or Firm* — Cuenot, Forsythe & Kim, LLC

(57) ABSTRACT

Provisioning infrastructure from visual diagrams can include selecting, with a first neural network, regions of interest within an infrastructure architecture diagram that corresponds to an infrastructure offered by an infrastructure provider for supporting a computer application. With a second neural network, infrastructure resources and interconnections among the infrastructure resources can be identified based on objects appearing within the regions of interest. Properties corresponding to the infrastructure resources identified can be determined with a third neural network. With a fourth neural network, an infrastructure architecture specification can be generated, the infrastructure architecture specification specifying the infrastructure resources, corresponding properties of the infrastructure resources, and interconnections among the infrastructure resources. The infrastructure architecture specification can be used to configure networked resources to support the computer application.

20 Claims, 9 Drawing Sheets

(56) References Cited

U.S. PATENT DOCUMENTS

| | | | |
|---|---|---|---|
| 2012/0215829 A1* | 8/2012 | Naphade | G06N 20/00 |
| | | | 709/203 |
| 2017/0171026 A1 | 6/2017 | Lucas et al. | |
| 2019/0028630 A1 | 1/2019 | Douglas et al. | |
| 2019/0155620 A1* | 5/2019 | Arunachalam | G06N 3/08 |
| 2020/0111020 A1* | 4/2020 | Heng | G06Q 10/06315 |
| 2020/0175352 A1* | 6/2020 | Cha | G06N 3/0454 |
| 2020/0302168 A1* | 9/2020 | Vo | G06N 3/0454 |

OTHER PUBLICATIONS

Mell, P. et al., The NIST Definition of Cloud Computing, National Institute of Standards and Technology, U.S. Dept. of Commerce, Special Publication 800-145, Sep. 2011, 7 pg.

\* cited by examiner

PROVISIONING INFRASTRUCTURE FROM VISUAL DIAGRAMS

BACKGROUND

This disclosure relates to on-demand computing services, and more particularly, to on-demand computing service applications infrastructure.

Cloud computing provides on-demand delivery of computing capabilities such as data processing, data storage, database management, computer-based applications, and other information technology (IT) resources. The resources are provided via the Internet, typically according to a pay-as-you-go pricing arrangement between a user and cloud-computing provider. A cloud services provider usually owns and maintains the network-connected hardware required for providing application services. A user can access the specific resources the user needs via a Web application. The arrangement can allow the user to concentrate on developing applications rather than managing infrastructure and data centers.

Anything as a Service (XaaS) is a characterization of cloud computing services that, though previously separated on either private or public clouds, are increasingly transparent and integrated. XaaS encompasses the delivery of IT as a service through hybrid cloud computing and can refer to either one or a combination of Software as a Service, Infrastructure as a Service, Platform as a Service, Communications as a Service, and/or Monitoring as a Service.

SUMMARY

In one or more embodiments, a method includes selecting by a first neural network, using computer hardware, regions of interest within an infrastructure architecture diagram corresponding to an infrastructure offered by an infrastructure provider to support a computer application. The method can include identifying by a second neural network, using the computer hardware, infrastructure resources and interconnections among the infrastructure resources based on objects appearing within the regions of interest. Additionally, the method can include determining by a third neural network, using the computer hardware, properties corresponding to the infrastructure resources identified. The method also can include generating by a fourth neural network, using the computer hardware, an infrastructure architecture specification specifying the infrastructure resources, corresponding properties of the infrastructure resources, and interconnections among the infrastructure resources. The infrastructure architecture specification can be used for configuring networked resources to support the computer application.

In one or more embodiments, a system includes a processor configured to initiate operations. The operations include selecting, with a first neural network, regions of interest within an infrastructure architecture diagram corresponding to an infrastructure offered by an infrastructure provider to support a computer application. The operations also can include identifying, with a second neural network, infrastructure resources and interconnections among the infrastructure resources based on objects appearing within the regions of interest. Additionally, the operations can include determining, with a third neural network, properties corresponding to the infrastructure resources identified. The operations also can include generating, with a fourth neural network, an infrastructure architecture specification specifying the infrastructure resources, corresponding properties of the infrastructure resources, and interconnections among the infrastructure resources. The infrastructure architecture specification can be used for configuring networked resources to support the computer application.

In one or more embodiments, a computer program product includes a computer readable storage medium having program instructions stored thereon. The program instructions are executable by a processor to initiate operations. The operations include selecting with a first neural network, by the processor, regions of interest within an infrastructure architecture diagram corresponding to an infrastructure offered by an infrastructure provider to support a computer application. The operations can include identifying with a second neural network, by the processor, infrastructure resources and interconnections among the infrastructure resources based on objects appearing within the regions of interest. Additionally, the operations can include determining with a third neural network, by the processor, properties corresponding to the infrastructure resources identified. The operations also can include generating with a fourth neural network, by the processor, an infrastructure architecture specification specifying the infrastructure resources, corresponding properties of the infrastructure resources, and interconnections among the infrastructure resources. The infrastructure architecture specification can used for configuring networked resources to support the computer application.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

Figure 1:
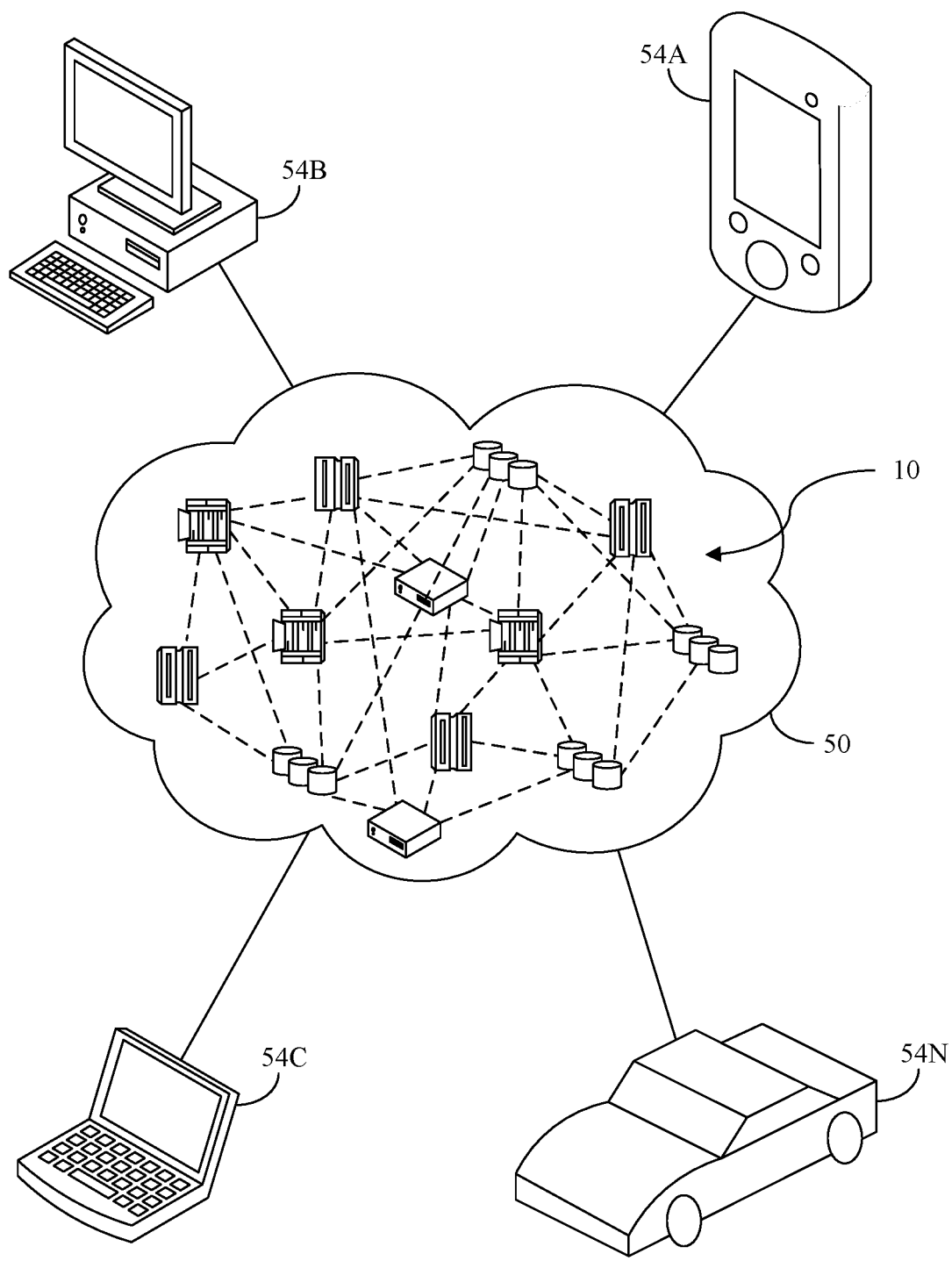
FIG. 1 depicts a cloud computing environment according to an embodiment of the present invention.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to on-demand computing services, and more particularly, to on-demand computing service applications infrastructure. As used herein, "infrastructure" includes physical resources as well as services and virtual (or logical) resources. An infrastructure thus can comprise one or more networked physical resources (e.g., web server) and/or services (e.g., data management, messaging, search and retrieval) provided over a data communication network to support a computer application. "Infrastructure provider," as used herein, is a provider who provides physical resources and/or logical resources and services, typically on-demand, over a data communications network. As used herein, "service provider" is also an infrastructure provider. Accordingly, an XaaS provider, for example, is an infrastructure provider, as the latter terms are used herein. A client of an infrastructure provider can be, for example, a computer application developer who develops a computer application and accesses an infrastructure provided by the infrastructure provider (e.g., XaaS provider) to support the computer application over a data communications network (e.g., the Internet).

The infrastructure of a cloud-computing environment, for example, is hosted by a cloud-computing infrastructure provider and provides a platform that a client uses to support a client-created application. The infrastructure can include networking, services, supporting applications, runtimes, and other resources that support the client-created application. For example, infrastructure resources can include virtual private networks and gateways. Infrastructure resources can include virtual appliances for creating pre-configured virtual machine images, for example. Services can include, for example, database management including tables of items and attributes and relational database services. Infrastructure resources can include queues, messages, and cloud searching services. These are only some representative examples of the many infrastructure resources that a cloud-computing service provider (e.g., XaaS provider) typically provides to clients.

There are different ways of provisioning an infrastructure. Typically, a client accesses infrastructure resources (physical components or services) via a portal, selecting the infrastructure resources one by one. The client, alternatively, can utilize an application programing interface (API) that provides a set of routines, protocols, and/or tools for provisioning the infrastructure resources.

An infrastructure for supporting a computer application or system (e.g., cloud-based application or system) frequently comprises multiple infrastructure resources, each having certain properties and interconnected with one or more other infrastructure resources. The infrastructure resources (physical components and services) and the infrastructure resources' various operative relations to one another are typically represented with diagrams known as infrastructure architecture diagrams. An infrastructure architecture diagram depicts schematically the provisioning of an infrastructure. As defined herein, "provisioning an infrastructure" means identifying specific infrastructure resources and configuring the arrangement of, or connections among, the specifically identified infrastructure resources. Typically, provisioning an infrastructure requires the user to manually select each infrastructure resource, resource-by-resource, via a portal, or alternatively, by utilizing an API provided by the infrastructure provider.

The methods, systems, and computer program products disclosed herein provide for the provisioning of infrastructure from a visual diagram of the infrastructure architecture. The provisioning can be performed automatically without human intervention. In accordance with the inventive arrangements disclosed herein, an infrastructure architecture diagram is analyzed by a succession of machine learning models (e.g., deep learning). The machine learning models identify and classify features (e.g., objects) within the infrastructure architecture diagram and, based on the analysis, generate an infrastructure architectural specification for automatically provisioning an infrastructure according to the infrastructure diagram.

An infrastructure architecture diagram can be created and converted into a specification for an infrastructure without special tools. Objects corresponding to specific types of infrastructure resources, as well as relations (interconnections) among the objects, are extracted from a diagram automatically. Newly introduced infrastructure resources can be identified based on machine learning across a wide spectrum of infrastructure provider offerings (e.g., cloud-based infrastructures) without use of a special declarative computer language.

Further aspects of the embodiments described within this disclosure are described in greater detail with reference to the figures below. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

It is understood in advance that although this disclosure includes a detailed description on cloud computing, implementations of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
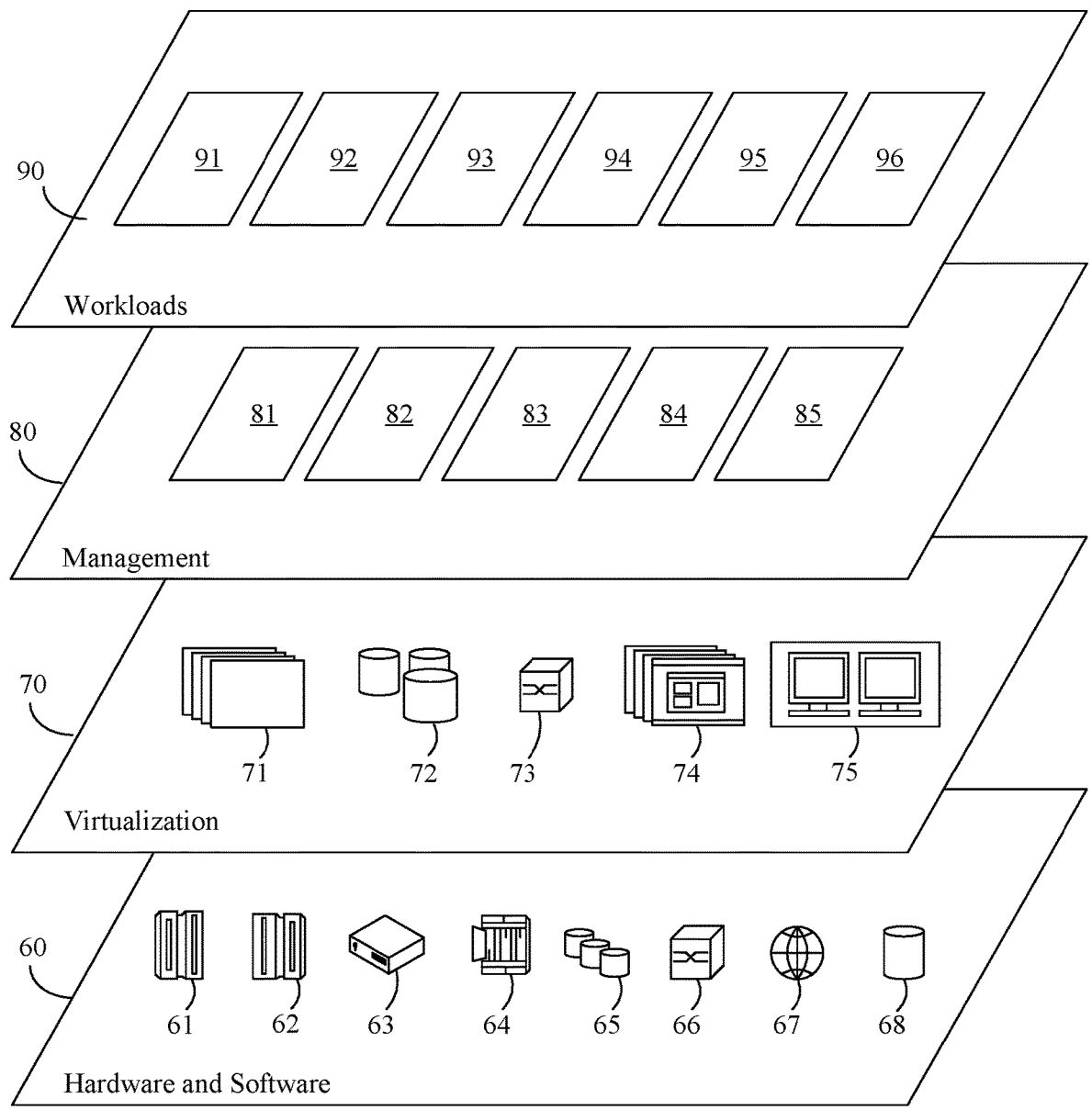
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and provisioning infrastructure from visual diagrams 96.

A system for provisioning infrastructure from visual diagrams 96 can include a first machine learning construct (e.g., neural network) for identifying regions of interest within an infrastructure architecture diagram. As defined herein, "region of interest" is a portion of an infrastructure architecture diagram that includes one or more objects appearing within the infrastructure architecture diagram. "Object," as defined herein is a graphical symbol within an infrastructure architecture diagram corresponding to an infrastructure resource (component or service) as well as text in the infrastructure architecture diagram indicating properties of the infrastructure resource. As also defined herein, "properties" mean fixed or variable parameters that determine the functioning of an infrastructure resources (e.g., network protocol of server and load balancer, server location, capacity of a database; see, e.g., FIG. 7A).

A diverse array of infrastructure resources can be represented by graphical symbols that represent the particular infrastructure resources in an infrastructure provider's portfolio. Infrastructure providers (e.g., a provider of cloud-computing services) often create and maintain a set of symbols representing the various infrastructure resources. The graphical symbols range from standard geometric structures (e.g., rectangle, oval) to elaborate pictures that suggest an underlying function of an infrastructure resource. As described herein, an inventive aspect of the system for provisioning infrastructure from visual diagrams 96 is the capability of the system to learn, using machine learning, how to identify and classify specific infrastructure resources that appear as graphical symbols within an infrastructure architecture diagram.

Thus, the system for provisioning infrastructure from visual diagrams 96 also can include a second machine learning construct for identifying infrastructure resources (based on objects within a diagram in the form of graphical symbols) and interconnections among the infrastructure resources corresponding to objects appearing within the regions of interest selected by the first neural network. The system also can include a third machine learning construct for determining properties (based on text appearing within objects) corresponding to the infrastructure resources identified. The system also can include a fourth machine learning construct that generates an infrastructure architecture specification specifying the infrastructure resources, corresponding properties of the infrastructure resources, and interconnections among the infrastructure resources. The infrastructure architecture specification can be used to automatically configure networked infrastructure resources to provide an infrastructure to support a computer application. Further features of system for provisioning infrastructure from visual diagrams 96 are described in greater detail below.

Figure 3:
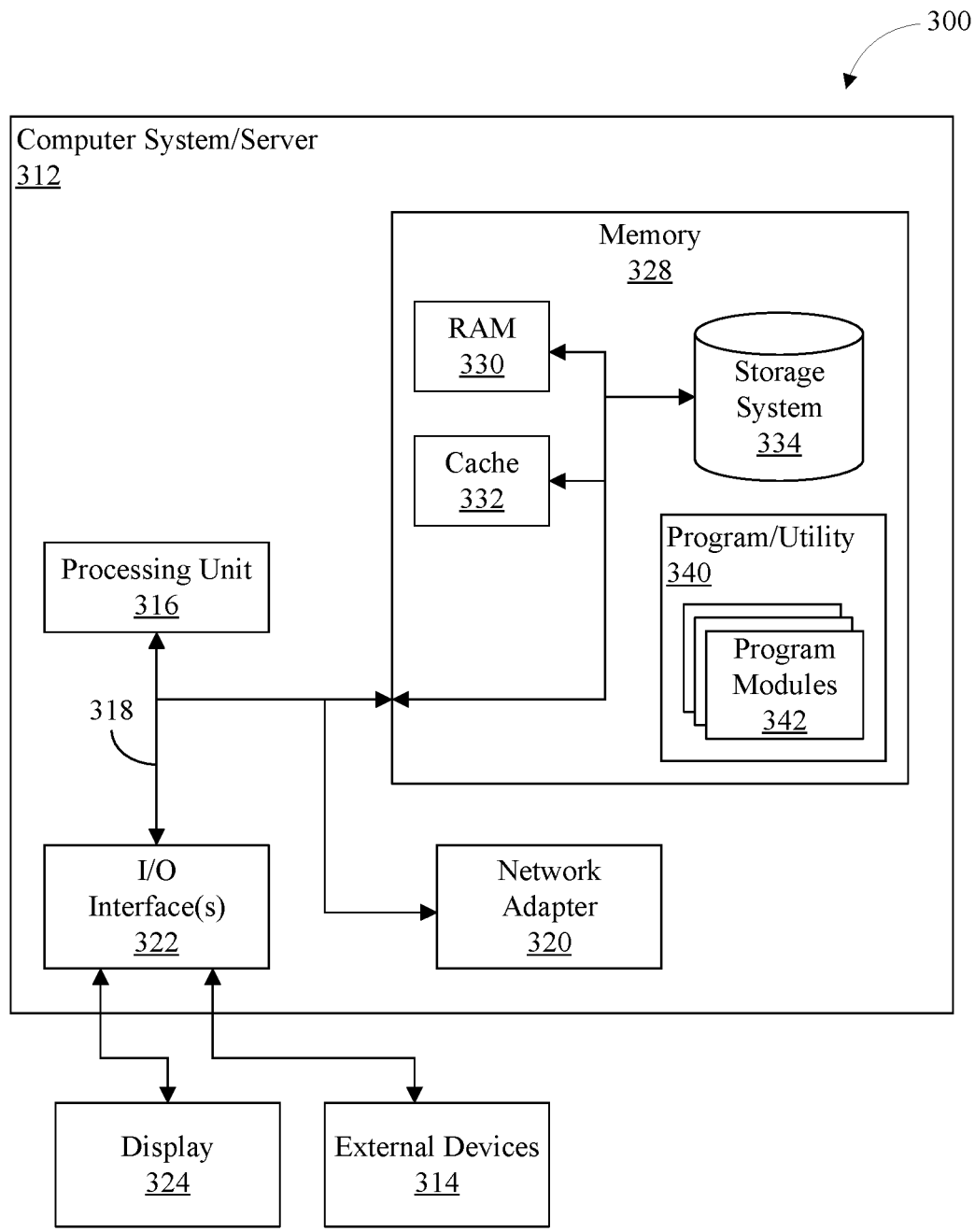
FIG. 3 depicts a cloud computing node according to an embodiment of the present invention.

FIG. 3 illustrates a schematic of an example of a computing node 300. In one or more embodiments, computing node 300 is an example of a suitable cloud computing node. Computing node 300 is not intended to suggest any limitation as to the scope of use or functionality of embodiments of the invention described herein. Computing node 300 is capable of performing any of the functionality described within this disclosure.

Computing node 300 includes a computer system 312, which is operational with numerous other general-purpose or special-purpose computing system environments or configurations. Examples of well-known computing systems, environments, and/or configurations that may be suitable for use with computer system 312 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 312 may be described in the general context of computer system-executable instructions, such as program modules, being executed by a computer system. Generally, program modules may include routines, programs, objects, components, logic, data structures, and so on that perform particular tasks or implement particular abstract data types. Computer system 312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system 312 is shown in the form of a general-purpose computing device. The components of computer system 312 may include, but are not limited to, one or more processors 316, a memory 328, and a bus 318 that couples various system components including memory 328 to processor 316.

Bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and PCI Express (PCIe) bus.

Computer system 312 typically includes a variety of computer system readable media. Such media may be any available media that is accessible by computer system 312, and may include both volatile and non-volatile media, removable and non-removable media.

Memory 328 may include computer system readable media in the form of volatile memory, such as random-access memory (RAM) 330 and/or cache memory 332. Computer system 312 may further include other removable/non-removable, volatile/non-volatile computer system storage media. By way of example, storage system 334 can be provided for reading from and writing to a non-removable, non-volatile magnetic media and/or solid-state drive(s) (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided.

In such instances, each can be connected to bus 318 by one or more data media interfaces. As will be further depicted and described below, memory 328 may include at least one program product having a set (e.g., at least one) of program modules that are configured to carry out the functions of embodiments of the invention.

Program/utility 340, having a set (at least one) of program modules 342, may be stored in memory 328 by way of example, and not limitation, as well as an operating system, one or more application programs, other program modules, and program data. Each of the operating system, one or more application programs, other program modules, and program data or some combination thereof, may include an implementation of a networking environment. Program modules 342 generally carry out the functions and/or methodologies of embodiments of the invention as described herein. For example, one or more of the program modules may include system 96 or portions thereof.

Program/utility 340 is executable by processor 316. Program/utility 340 and any data items used, generated, and/or operated upon by computer system 312 are functional data structures that impart functionality when employed by computer system 312. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer system 312 may also communicate with one or more external devices 314 such as a keyboard, a pointing device, a display 324, etc.; one or more devices that enable a user to interact with computer system 312; and/or any devices (e.g., network card, modem, etc.) that enable computer system 312 to communicate with one or more other computing devices. Such communication can occur via input/output (I/O) interfaces 322. Still yet, computer system 312 can communicate with one or more networks such as a local area network (LAN), a general wide area network (WAN), and/or a public network (e.g., the Internet) via network adapter 320. As depicted, network adapter 320 communicates with the other components of computer system 312 via bus 318. It should be understood that although not shown, other hardware and/or software components could be used in conjunction with computer system 312. Examples, include, but are not limited to: microcode, device drivers, redundant processing units, external disk drive arrays, RAID systems, tape drives, and data archival storage systems, etc.

While computing node 300 is used to illustrate an example of a cloud computing node, it should be appreciated that a computer system using an architecture the same as or similar to that described in connection with FIG. 3 may be used in a non-cloud computing implementation to perform the various operations described herein. In this regard, the example embodiments described herein are not intended to be limited to a cloud computing environment. Computing node 300 is an example of a data processing system. As defined herein, the term "data processing system" means one or more hardware systems configured to process data, each hardware system including at least one processor programmed to initiate operations and memory.

Computing node 300 is an example of computer hardware. Computing node 300 may include fewer components than shown or additional components not illustrated in FIG. 3 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

Computing node 300 is also an example of a server. As defined herein, the term "server" means a data processing system configured to share services with one or more other data processing systems. As defined herein, the term "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. In one or more embodiments, the various user devices described herein may be client devices. Network infrastructure, such as routers, firewalls, switches, access points and the like, are not client devices as the term "client device" is defined herein.

Figure 4:
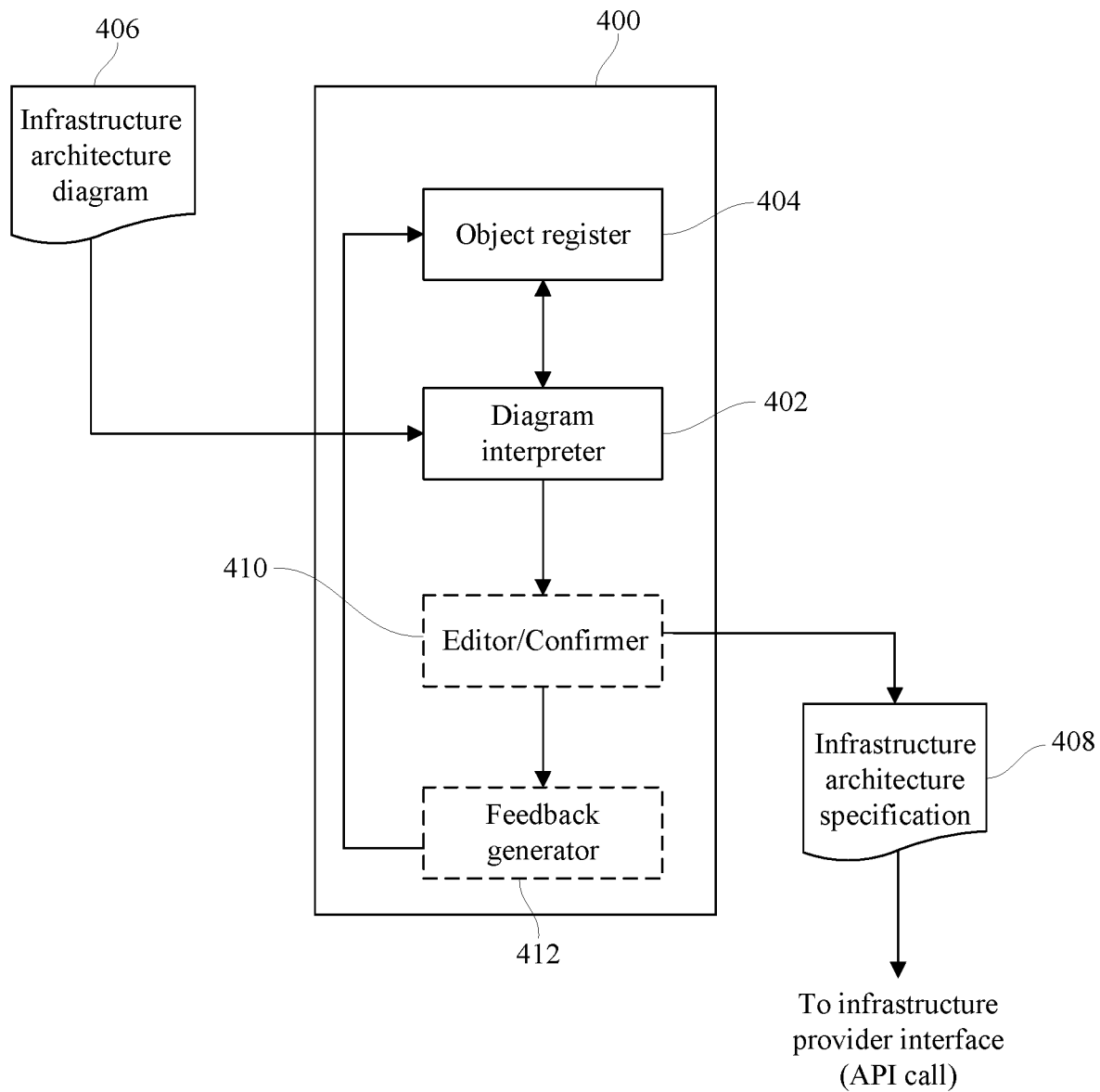
FIG. 4 depicts a system for provisioning infrastructure from visual diagrams according to an embodiment of the present invention.

FIG. 4 depicts system 400, which in one embodiment is a system similar to the system for provisioning infrastructure from visual diagrams 96 described in reference to FIG. 2. System 400 illustratively includes diagram interpreter 402 and object register 404. Diagram interpreter 402 can be implemented in computer system-executable instructions that run on the one or more processors of a computer system such as the one or more processors 316 of computer system 312 described in reference to FIG. 3. Accordingly, diagram interpreter 402 can reside in a memory such as memory 328 and be conveyed to the one or more processors 316 via a bus such as bus 318 also described in referenced to FIG. 3. Object register 404 can comprise one or more registers of a computer system and/or an allocated portion of computer system memory such as memory 328 of computer system 312.

The computer system in which system 400 is implemented can be, according to one embodiment, a computer system that is used by a developer of computer applications and that communicatively couples via a network (e.g., the Internet) to one or more infrastructure computers (e.g., one or more cloud-based servers) of an infrastructure provider (e.g., XaaS provider). The infrastructure computers can provide physical infrastructure resources (e.g., servers, disk storage) as well as software-based infrastructure services (e.g., data security). In another embodiment, system 400 can be part of the offerings of an infrastructure provider (e.g., XaaS provider) and can be accessed by the application developer over a data communications network (e.g., the Internet).

Referring still to FIG. 4, system 400 operatively receives infrastructure architecture diagram 406. Infrastructure architecture diagram 406 can include various objects representing any of a diverse array of infrastructure resources that may be offered by an infrastructure provider. The objects appear as graphical symbols with text that represent the particular infrastructure resources and specific properties of the infrastructure resources. Various objects can be line-connected, the lines indicating interconnections among the infrastructure resources represented by the objects. Diagram interpreter 402 identifies the infrastructure resources shown symbolically within infrastructure architecture diagram 406. Based on infrastructure architecture diagram 406, diagram interpreter 402 determines specific interconnections among the infrastructure resources and the properties of each. The determinations made by diagram interpreter 402 can be stored in object register 404 for generating an infrastructure architecture specification. The infrastructure architecture specification is generated by diagram interpreter 402 in a form and format usable by an interface for configuring networked resources into an infrastructure (configured according to the infrastructure architecture diagram) that supports a computer application.

Diagram interpreter 402 can by trained to identify and categorize different objects (infrastructure resources) using machine learning (e.g., deep learning). Using machine learning, diagram interpreter 402 can be trained to determine interconnections among and properties of the infrastructure resources in various configurations. For example, diagram interpreter 402 can comprise a plurality of different neural networks, through each of which an infrastructure architecture diagram can be evaluated to identify and determine the interconnections among and properties of the infrastructure resources depicted by the infrastructure architecture diagram. Having interpreted the infrastructure architecture diagram, diagram interpreter 402 can generate a corresponding infrastructure architecture specification that is input into an infrastructure provider interface to configure an infrastructure according to the infrastructure architecture specification. For example, according to one embodiment, system 400 can call an XaaS API and input the generated infrastructure architecture specification. The XaaS can provision the relevant infrastructure resources arranged according to the infrastructure architecture specification generated by diagram interpreter 402.

Diagram interpreter 402 can be implemented with multiple neural networks constructed using machine learning to interpret an infrastructure architecture diagram. The neural networks, in one embodiment, are convolutional neural networks. A convolutional neural network (CNN) is a multi-layer neural network that, in at least some layers, uses convolution in place of general matrix multiplication (as used with some other types of neural networks). CNNs can learn spatial hierarchies of patterns. The patterns learned by a CNN are translation invariant. Properties such as these make CNNs well-suited for processing data having grid-like topologies, such as image data represented as 2-dimensional grids of pixels. Each layer of a CNN can comprise different stages. A convolution layer, based on affine transforms, can perform several convolutions in parallel to produce a set of linear activations. Each linear activation can be processed by a detector layer based on a nonlinear activation function (e.g., rectified linear). A pooling layer can replace the output of a specific net output (e.g., corresponding to a specific image location) with a summary statistic (e.g., max pooling, rectangular neighborhood average, weighted average, $L^2$ norm) based on nearby net outputs (e.g., nearby the corresponding image location), thereby reducing neural network dimensionality.

Figure 5:
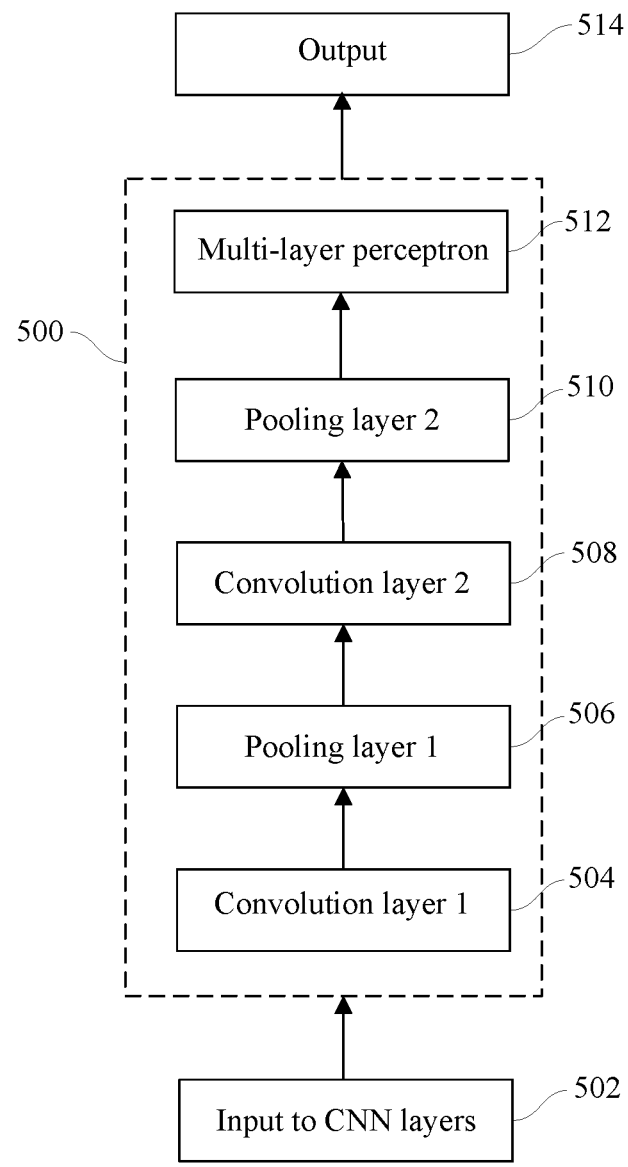
FIG. 5 depicts certain operative features of a system for provisioning infrastructure from visual diagrams according to an embodiment of the present invention.

Referring additionally to FIG. 5, CNN 500 is representative of a CNN used by system 400 to implement diagram interpreter 402. CNN 500 illustratively comprises distinct layers that implement feature extraction in interpreting an infrastructure architecture diagram such as infrastructure architecture diagram 406. Input 502 is divided into receptive fields that feed into convolutional layer 504. Convolution layer 504 extracts features from input 502. The output of convolution layer 504 is input into pooling layer 506. Pooling preformed at pooling layer 506 reduces the dimensionality of the features extracted at convolution layer 504 (e.g., by down sampling), while retaining the most critical information (e.g., based on max pooling). An additional convolution (layer 508) and pooling (layer 510) are performed. The output can be fed into a fully connected multi-layer perceptron (MLP) 512. An MLP is a feedforward neural network that includes a non-linear activation function and can be trained to classify patterns, even patterns that are not linearly separable.

The final output layer 514 comprises a set of nodes. Each node of the final output layer 514 can correspond to a feature that is assigned a particular label (e.g., numerical identifier). Each feature corresponds to an infrastructure resource that CNN 500 is trained using machine learning to identify and to classify. CNN 500 can be trained using backpropagation applied to a set of training data (e.g., pre-labeled infrastructure architecture diagrams).

Figure 6:
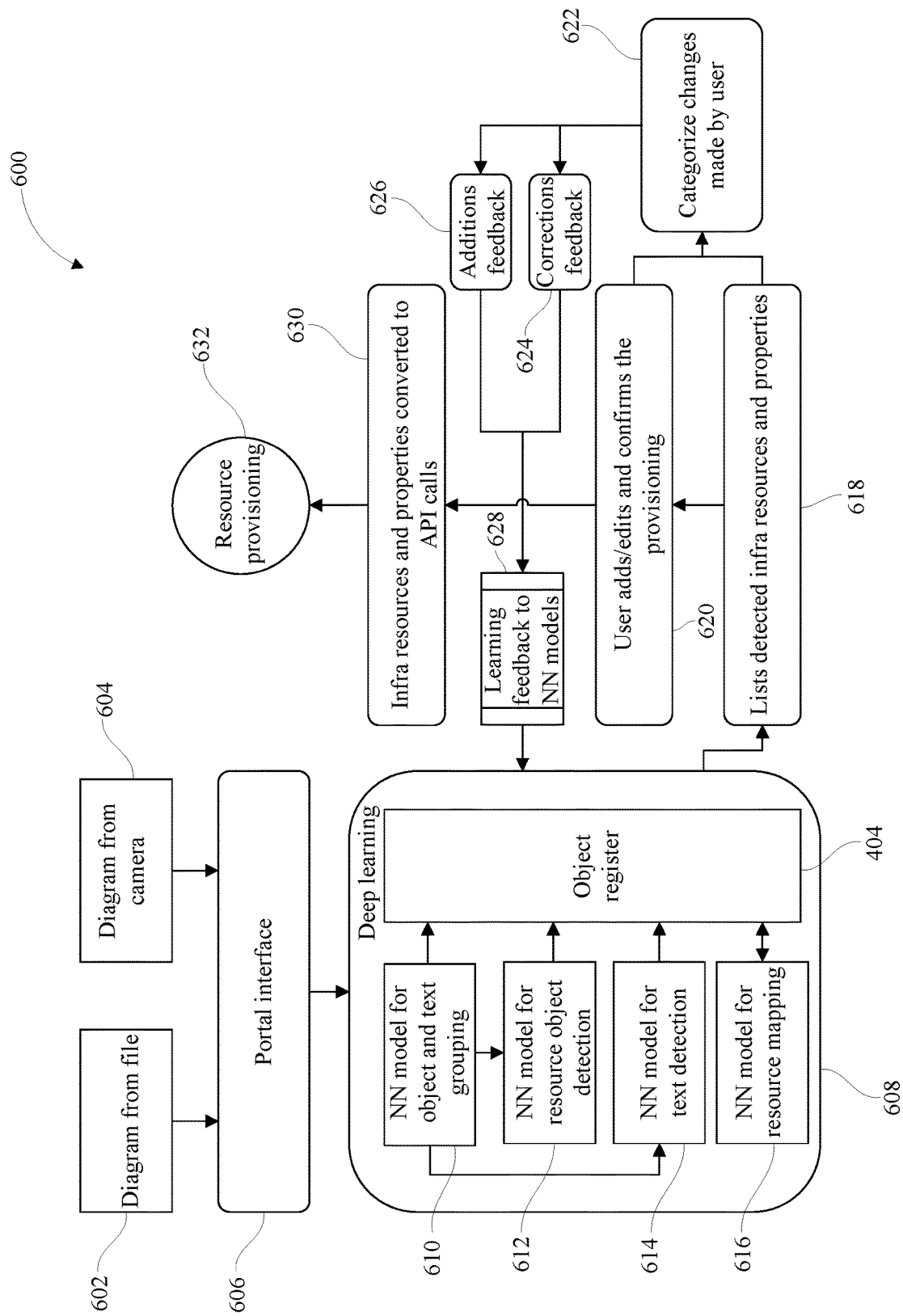
FIG. 6 depicts a representative convolutional neural network used in a system for provisioning infrastructure from visual diagrams according to an embodiment of the present invention.

Referring additionally now to FIG. 6, certain operative features 600 of system 400, according to one embodiment, are depicted. Initially an infrastructure architecture diagram 602 can be retrieved from an electronic file or an image of a hand-drawn infrastructure architecture diagram 604 can be captured with a camera. Optionally, the infrastructure architecture diagram can be input to system 400 via portal interface 606. System 400, as described above, can be configured to interpret the infrastructure architecture diagram and, based on the infrastructure architecture diagram, generate a set of specifications that specify which infrastructure resources are used and how the infrastructure resources are interconnected to construct an infrastructure to support a specific application.

System 400 can interpret the infrastructure architecture diagram and generate the specification by identifying and classifying features based on models trained using deep learning 608 (e.g., CNN). Neural network 610 groups objects (e.g., graphical or symbolic representations of infrastructure resources) and corresponding text. The output of neural network 610 is input to neural network 612 and to neural network 614. Neural network 612 is trained to detect and identify specific objects, and neural network 614 is trained to detect and classify corresponding text. The output of neural networks 610-614 can be electronically stored in object register 404.

Neural network 616 maps the objects and text to specific infrastructure resources, as well as the infrastructure resources' corresponding properties and the interconnections among the infrastructure resources. Based on the mapping, diagram interpreter generates list 618 of the infrastructure resources and corresponding properties, also indicating interconnections among the infrastructure resources.

Optionally, system 400 also includes editor/confirmer 410. Accordingly, in one embodiment, list 618 is optionally presented to a system user. The system user can add to and/or edit list 618. The user provides confirmation 620 for the provisioning of infrastructure resources according to the system-generated specification, subject to any additions and/or edits the user may make. System 400 also optionally can include feedback generator 412. Feedback generator 412 can categorize changes 622 made by the user (if any). The feedback from feedback generator 412 can include user-specified corrections 624 and user-specified additions 626. The user-specified corrections 624 and user-specified additions 626 can be converted into machine learning feedback 628. The machine learning feedback 628 can be used to refine and/or update neural networks 610-616. In response to a user confirmation (if optionally required), the specification generated (infrastructure resources, including corresponding properties and interconnections) by diagram interpreter 402 can be converted to API calls 630 to an infrastructure provider. The infrastructure provider can provision infrastructure resources 632 according to the specification generated by system 400.

In different embodiments in which system 400 is implemented in computer system-executable instructions, the neural networks of diagram interpreter 402 can be created using dataflow and differentiable programming paradigms. Data flow programing models a set of computer system-executable instructions as a directed graph of data flowing between operations. Differentiable programming provides automatic differentiation, which can implement the gradient decent operation used in backpropagation for training a neural network. These paradigms can be implemented using open-source software libraries such as TensorFlow, Theano, CNTX, and MXNet. Using these paradigms, diagram interpreter 402 can analyze an infrastructure architectural diagram as a graph comprising nodes and edges. The nodes represent mathematical operations, while the graph edges represent multidimensional data arrays (tensors) that are communicated between them.

In one embodiment, diagram interpreter 402 implements the single shot multi-box detector, or SSD, model to identify distinct objects in an infrastructure architecture diagram. SSD is a method for detecting objects in images using a deep neural network. SSD is based on a feed-forward convolutional network that produces a fixed-size collection of bounding boxes and scores for the presence of object class instances in those boxes, followed by a non-maximum suppression step to produce the final detections. For the bounding boxes with greatest overlap, ones with the highest score are retained. SSD discretizes the output of bounding boxes into a set of default boxes over different aspect ratios and scales per feature map location. SSD generates the scores corresponding to the presence of each object category in each default box and adjusts each default box to better match the object shape. Additionally, model-based object identifications from multiple images (or feature maps) can be combined with different resolutions to handle objects of various sizes. Diagram interpreter 402, in the following working example, incorporates the SSD model.

Figure 7A:
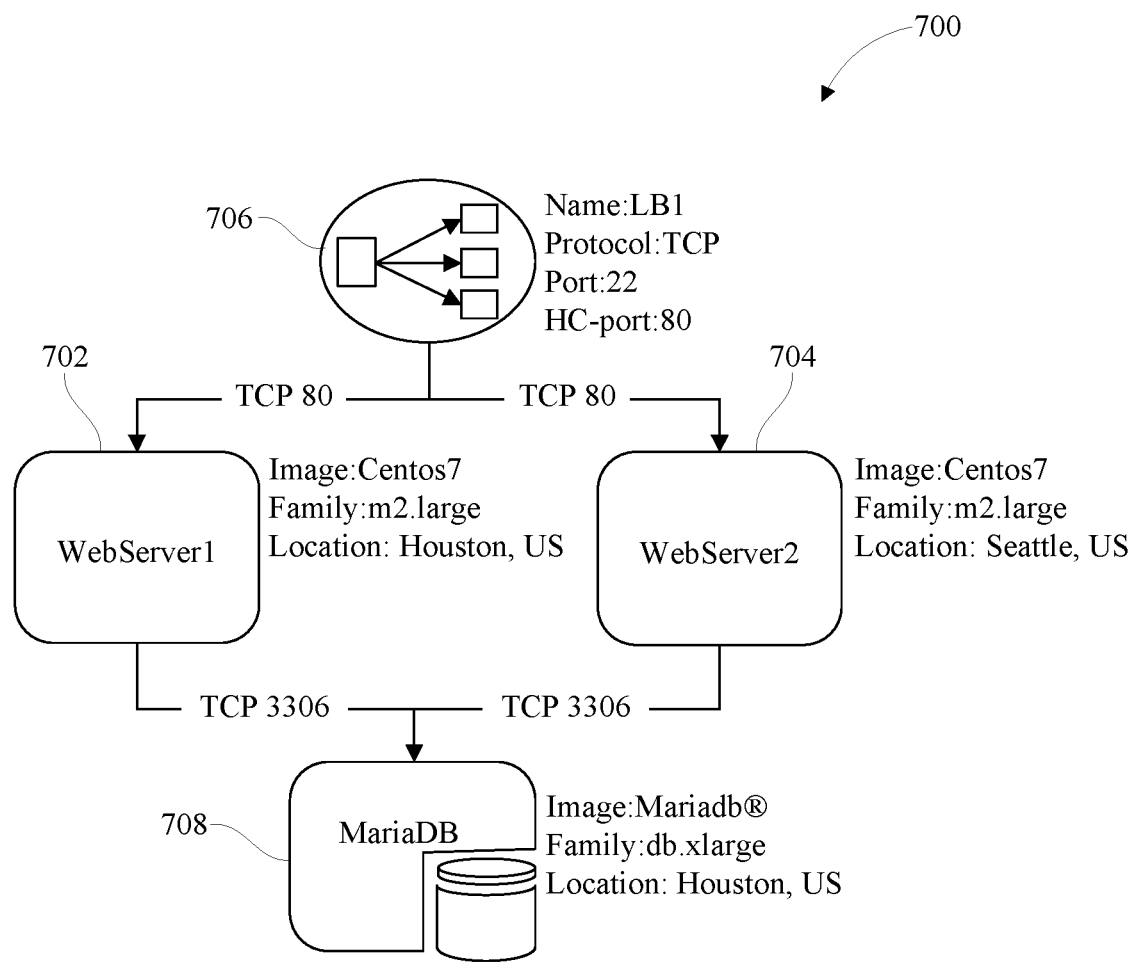
FIGS. 7A and 7B depicts a representative infrastructure architecture diagram and certain operative features with respect to the diagram performed with a system for provisioning infrastructure from visual diagrams according to an embodiment of the present invention.
Figure 7B:
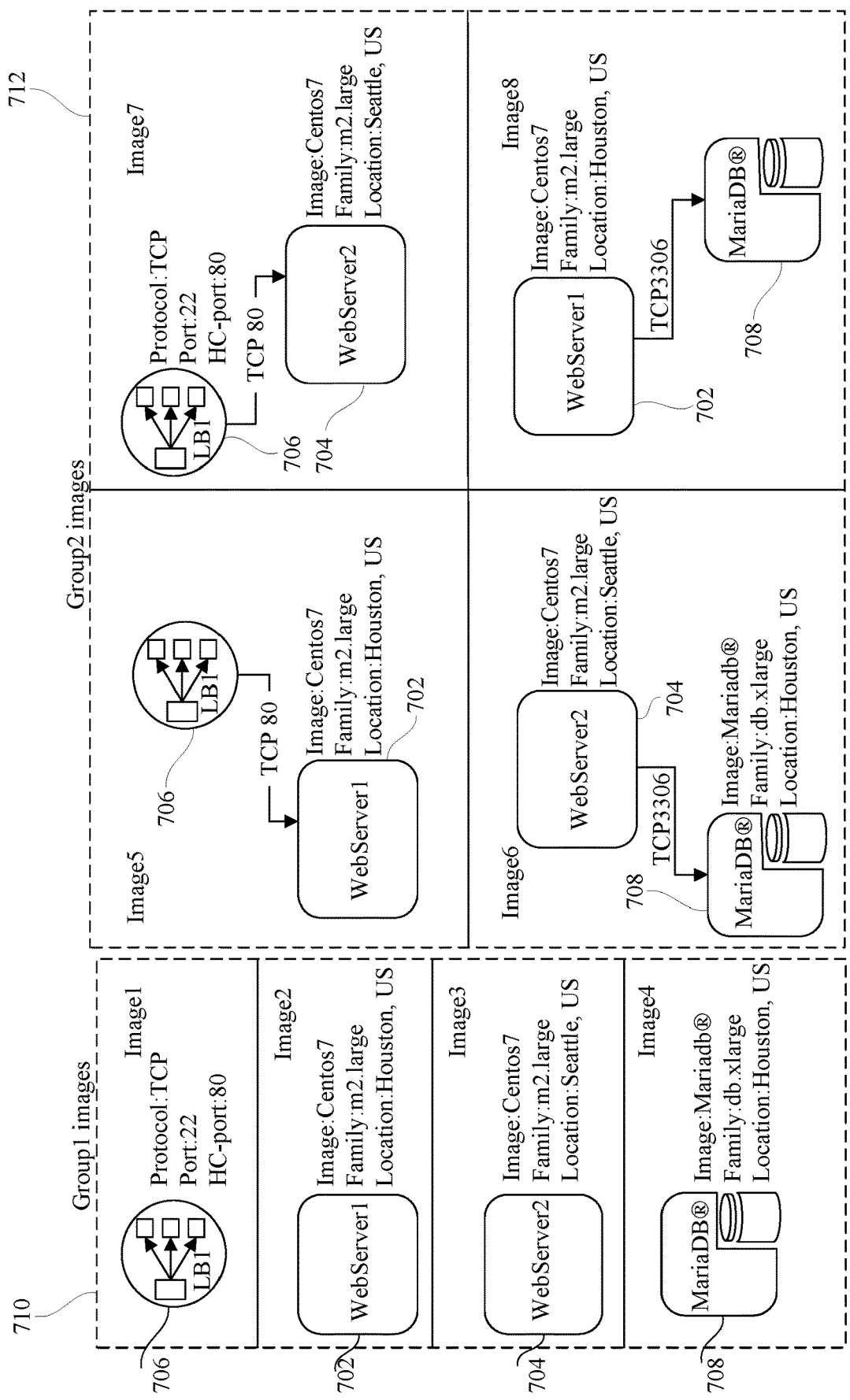

FIGS. 7A and 7B depict an example infrastructure architecture diagram 700 and operations performed on the diagram, according to one embodiment, by a system for provisioning infrastructure from visual diagrams. Infrastructure architecture diagram 700 pertains to a two-tier computer application that relies on an infrastructure comprising first web server 702, second web server 704, load balancer 706, and backend database 708, each of which is represented in the diagram as an object. Each object comprises a graphical symbol indicating a specific infrastructure resource type and text specifying specific properties corresponding to the infrastructure resource.

Infrastructure architecture diagram 700 is input into a system for provisioning infrastructure from visual diagrams that, as described above, can include a diagram interpreter comprising four deep learning neural networks (e.g., CNN). A first neural network of the system groups the objects (graphical symbols and corresponding properties text) by selecting certain regions of interest in infrastructure architecture diagram 700 and saving the selected regions in a single image. Remaining portions of infrastructure architecture diagram 700 not selected are eliminated by cropping out and discarding the unwanted portions. The system groups objects from the retained portions into two groups as shown in FIG. 7B. Group I 710 comprises image1, image2, image3, and image4, each image corresponding to an SSD bounding box described above. Group I 710 objects (graphical symbol and text) in each image (bounding box) represent individual infrastructure resources—namely first web server 702, second web server 704, load balancer 706, and backend database 708—as well as the infrastructure resource's corresponding properties. Group II 712 comprises images image5, image6, image7, and image8, each image (bounding box) comprising a linked pair of objects. Each linked pair of objects exhibits a "from-to" relation reflecting paired interconnections between the respective infrastructure resources represented by the objects.

The results generated by the first neural network are stored in an object register, as described above. The object register can be populated with serial numbers corresponding to each of the images generated, along with a file name for each of the images present in both Group I 710 and Group II 712. (The object register is used to store information as the information is generated by each of the neural networks.)

The output of the first neural network comprising bounding boxes from Group I 710 and Group II 712 provides the input to the second neural network. The second neural network identifies infrastructure resources based on the objects contained in the bounding boxes corresponding to image1, image2, image3, and image4. Specifically, each object comprises a graphical symbol and text, and the second neural network is trained to associate specific graphical symbols with specific infrastructure resources (e.g., load balancer, server, database, firewall). Accordingly, the second neural network identifies the particular infrastructure resources based on the graphical symbols in the infrastructure architecture diagram. The second neural network, having identified the infrastructure resources based on Group I 710 images (bounding boxes), next determines relationships between the objects (infrastructure resources interconnections) based on Group II 712 images. Group II 712 images comprise object pairs indicating "from-to" or "to-from" interconnections. As the images comprise more than one object, a reference object is necessary to represent relationships (interconnections) between the objects. According to one convention, one object is designated as primary and the other secondary based on the following rule: if the objects are in a vertical relationship, the topmost object is designated as primary, and if the objects are in a horizontal relationship, the leftmost object is designated as primary. Other conventions can be used to represent the relationships between the objects, depending on a user's preference.

The third neural network is trained to convert text to values (or characters) indicating the properties of specific infrastructure resources. The output of the first neural network (Group I 710 and Group II 712) is input to the third neural network. The third neural network extracts each infrastructure resource name and corresponding property values contained in each image and further populates the information in the object register. Each infrastructure resource name and corresponding property values are passed from the object register into the fourth neural network. The fourth neural network maps each infrastructure resource name and all relevant properties, creating a new object register to store the resulting infrastructure architecture specification.

Thus, based on the information generated at each stage by each neural network, the infrastructure architecture diagram is converted to an object register containing infrastructure resource definitions with resource types, resource names and all relevant properties of the infrastructure resources, as well as interconnections among each. The information can be used to generate an infrastructure comprising the infrastructure resources appearing in the infrastructure architecture diagram and arranged according to the interconnections shown in the infrastructure architecture diagram. In one embodiment, the information is optionally provided to a user via an XaaS portal for adding any other information and for validation or correction. Any addition (e.g., adding a new service, resource, or connection relation) can be classified as such, whereas any corrections made by user on existing identified infrastructure resources (or services) will be classified as such. Additions and corrections can be provided via a feedback loop to the neural networks and used for updating or refining each of the neural network models. In one embodiment, the system generates relevant API calls to an infrastructure-providing system (e.g., XaaS provider system or other cloud-based system) for provisioning an infrastructure according to the infrastructure architecture specification, the infrastructure configured to support a computer application.

Figure 8:
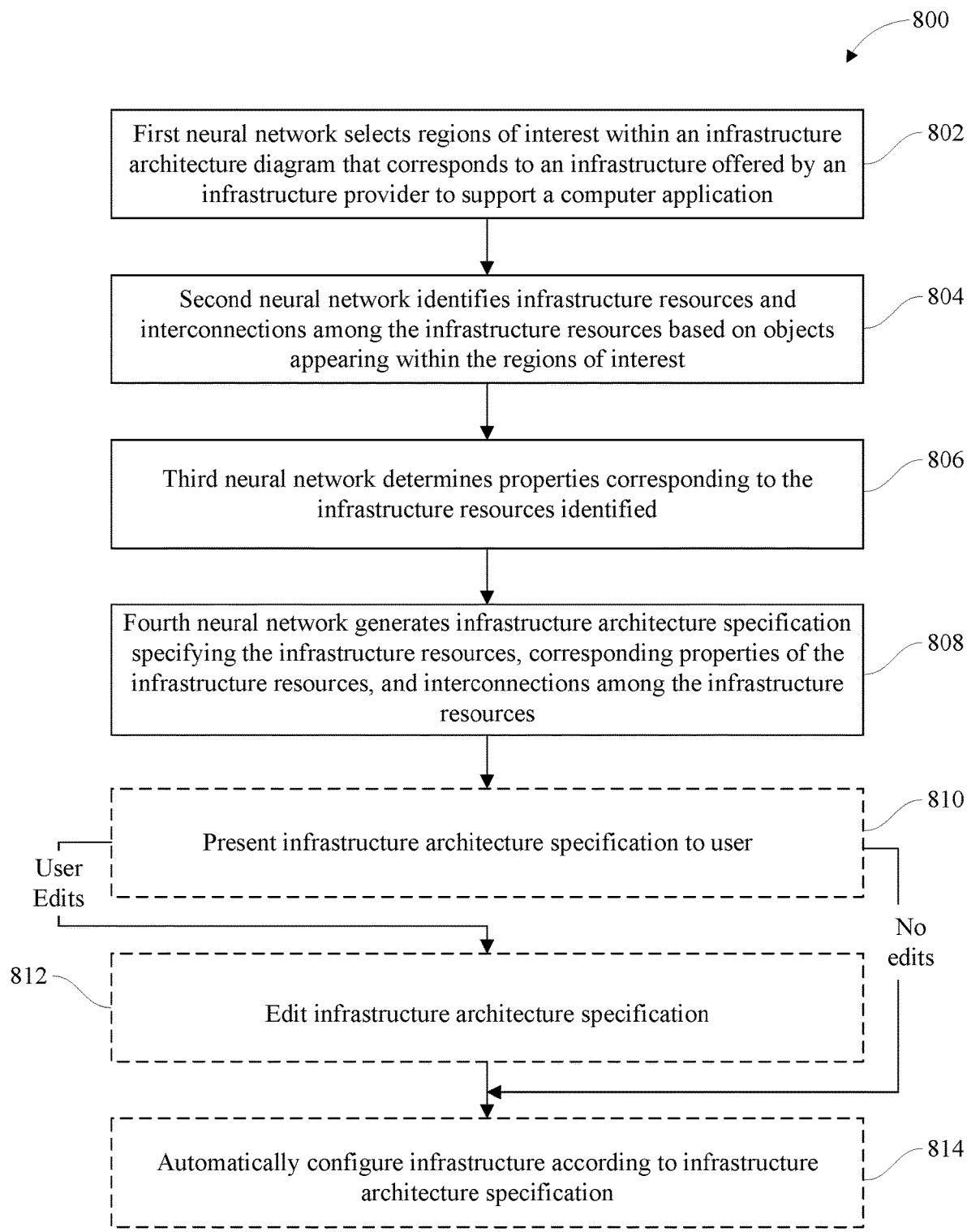
FIG. 8 is a flowchart of a method of provisioning infrastructure from visual diagrams according to an embodiment of the present invention.

FIG. 8 is a flowchart of method 800 for provision infrastructure from visual diagrams, according to one embodiment. Method 800 can be performed by a system the same as or similar to the systems described in reference to FIGS. 1-7. The system at 802, using a first neural network, can select regions of interest within an infrastructure architecture diagram. The infrastructure architecture diagram can correspond to an infrastructure offered by an infrastructure provider to support a computer application. The computer application, for example, can be a cloud-based computer application created by a user of the system. With a second neural network, the system at 804 can identify infrastructure resources and interconnections among the infrastructure resources based on objects appearing within the regions of interest. At 806, the system using a third neural network can determine properties corresponding to the infrastructure resources identified. An infrastructure architecture specification can be generated at 808 by the system using a fourth neural network.

The infrastructure architecture specification can specify the infrastructure resources, corresponding properties of the infrastructure resources, and interconnections among the infrastructure resources for configuring networked resources to support the computer application. The infrastructure architecture specification can be submitted, for example, to the infrastructure provider for configuring the networked resources.

In one embodiment, selecting regions of interest can include generating images of each of the regions of interest and grouping the images into a first group and a second group. Each image of the first group can contain a single object. Each image of the second group can contain an interconnected pair of objects. The first neural network in performing the selecting of regions of interest can implement an SSD model, and each image of the first and second groups can correspond to a bounding box generated based on the SSD model.

The objects appearing within the regions of interest can comprise a plurality of graphical symbols. Each graphical system can be predetermined (e.g., by an infrastructure provider) to correspond to one and only one of a plurality of infrastructure resources. Accordingly, the second neural network can be trained using machine learning to identify each infrastructure resource based on a corresponding graphical symbol, the graphical symbol appearing as an object within the infrastructure architecture diagram.

In another embodiment, the system optionally at 810 can present the infrastructure architecture specification to the user. The user can specify additions and/or corrections to the infrastructure specification. In response to user-supplied input, or edits, the infrastructure architecture specification can be modified at 812, after which the infrastructure architecture, as modified, can be submitted to an infrastructure provider for configuring infrastructure resources.

In still another embodiment, whether in response to a user's instruction or directly in response to the generation of the infrastructure architecture specification by the fourth neural network, the system optionally at 814 can automatically configure networked resources to support the application according to the infrastructure architecture specification. For example, in one embodiment, the system can generate any and all relevant API calls to an infrastructure-providing system (e.g., XaaS system) for provisioning the infrastructure based on the infrastructure architecture specification.

In yet another embodiment, the system can include a feedback loop with which feedback based on user-supplied input can be provided. The feedback can be used for updating or refining the first neural network, the second neural network, the third neural network, and/or the fourth neural network.

The terminology used herein is for the purpose of describing particular embodiments only and is not intended to be limiting. Notwithstanding, several definitions that apply throughout this document now will be presented.

As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human interaction.

As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, the term "if" and "when" and "upon" mean "in response to" or "responsive to," depending upon the context. Thus, the phrase "if it is determined" or "if [a stated condition or event] is detected" is to be construed as "in response to detecting [the stated condition or event]" or "responsive to detecting [the stated condition or event]" depending on the context.

As defined herein, the phrases "responsive to" and "in response to" mean responding or reacting readily to an action or event. Thus, if a second action is performed "responsive to" a first action, there is a causal relationship between an occurrence of the first action and an occurrence of the second action. The phrases "responsive to" and "in response to" thus indicate causal relationships.

As defined herein, the terms "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, the term "output" means storing in physical memory elements, e.g., devices, writing to display or other peripheral output device, sending or transmitting to another system, exporting, or the like.

As defined herein, the term "processor" means at least one hardware circuit configured to carry out instructions. The instructions may be contained in program instructions. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

The term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

As defined herein, the term "user" means a human being.

The terms first, second, etc. may be used herein to describe various elements. These elements should not be limited by these terms, as these terms are only used to distinguish one element from another unless stated otherwise or the context clearly indicates otherwise.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    selecting by a first neural network, using computer hardware, regions of interest within an infrastructure architecture diagram corresponding to an infrastructure offered by an infrastructure provider to support a computer application;
    identifying by a second neural network, using the computer hardware, infrastructure resources and interconnections among the infrastructure resources based on objects appearing within the regions of interest;
    determining by a third neural network, using the computer hardware, properties corresponding to the infrastructure resources identified; and
    generating by a fourth neural network, using the computer hardware, an infrastructure architecture specification specifying the infrastructure resources, corresponding properties of the infrastructure resources, and interconnections among the infrastructure resources, wherein the infrastructure architecture specification is usable for configuring networked resources to support the computer application.

2. The method of claim 1, wherein the selecting comprises:
    generating images of each of the regions of interest; and
    grouping the images into a first group and a second group, wherein each image of the first group contains a single object, and wherein each image of the second group contains an interconnected pair of objects.

3. The method of claim 2, wherein the first neural network implements a single shot multi-box detector (SSD) model, and wherein each image corresponds to a bounding box generated based on the SSD model.

4. The method of claim 1, wherein each object comprises one of a plurality of graphical symbols, each of which is predetermined to correspond to only one of a plurality of infrastructure resources, and wherein the second neural network is trained using machine learning to identify each infrastructure resource based on a corresponding graphical symbol.

5. The method of claim 1, further comprising automatically configuring networked resources to support the application according to the infrastructure architecture specification.

6. The method of claim 1, wherein the generating further comprises presenting the infrastructure architecture specification to a user and modifying infrastructure architecture specification in response to user-supplied input and submitting the infrastructure architecture specification as modified to the infrastructure provider.

7. The method of claim 1, further comprising generating feedback based on user-supplied input and updating at least one of the first neural network, the second neural network, the third neural network, and the fourth neural network based on the feedback.

8. A system, comprising:
    a processor configured to initiate operations including:
        selecting, with a first neural network, regions of interest within an infrastructure architecture diagram corresponding to an infrastructure offered by an infrastructure provider to support a computer application;
        identifying, with a second neural network, infrastructure resources and interconnections among the infrastructure resources based on objects appearing within the regions of interest;
        determining, with a third neural network, properties corresponding to the infrastructure resources identified; and
        generating, with a fourth neural network, an infrastructure architecture specification specifying the infrastructure resources, corresponding properties of the infrastructure resources, and interconnections among the infrastructure resources, wherein the infrastructure architecture specification is usable for configuring networked resources to support the computer application.

9. The system of claim 8, wherein the selecting includes:
    generating images of each of the regions of interest; and
    grouping the images into a first group and a second group, wherein each image of the first group contains a single object, and wherein each image of the second group contains an interconnected pair of objects.

10. The system of claim 9, wherein the first neural network implements a single shot multi-box detector (SSD) model, and wherein each image corresponds to a bounding box generated based on the SSD model.

11. The system of claim 8, wherein each object comprises one of a plurality of graphical symbols, each of which is predetermined to correspond to only one of a plurality of infrastructure resources, and wherein the second neural network is trained using machine learning to identify each infrastructure resource based on a corresponding graphical symbol.

12. The system of claim 8, wherein the processor is configured to initiate operations further including automatically configuring networked resources to support the application according to the infrastructure architecture specification.

13. The system of claim 8, wherein the generating further includes presenting the infrastructure architecture specification to a user and modifying infrastructure architecture specification in response to user-supplied input and submitting the infrastructure architecture specification as modified to the infrastructure provider.

14. A computer program product comprising a computer readable storage medium having program instructions embodied therewith, the program instructions executable by a processor to cause the processor to initiate operations comprising:
  selecting with a first neural network, by the processor, regions of interest within an infrastructure architecture diagram corresponding to an infrastructure offered by an infrastructure provider to support a computer application;
  identifying with a second neural network, by the processor, infrastructure resources and interconnections among the infrastructure resources based on objects appearing within the regions of interest;
  determining with a third neural network, by the processor, properties corresponding to the infrastructure resources identified; and
  generating with a fourth neural network, by the processor, an infrastructure architecture specification specifying the infrastructure resources, corresponding properties of the infrastructure resources, and interconnections among the infrastructure resources, wherein the infrastructure architecture specification is usable for configuring networked resources to support the computer application.

15. The computer program product of claim 14, wherein the selecting comprises:
  generating images of each of the regions of interest; and
  grouping the images into a first group and a second group, wherein each image of the first group contains a single object, and wherein each image of the second group contains an interconnected pair of objects.

16. The computer program product of claim 15, wherein the first neural network implements a single shot multi-box detector (SSD) model, and wherein each image corresponds to a bounding box generated based on the SSD model.

17. The computer program product of claim 14, wherein each object comprises one of a plurality of graphical symbols, each of which is predetermined to correspond to only one of a plurality of infrastructure resources, and wherein the second neural network is trained using machine learning to identify each infrastructure resource based on a corresponding graphical symbol.

18. The computer program product of claim 14, wherein the program instructions are executable by the processor to cause the processor to initiate operations further comprising automatically configuring networked resources to support the application according to the infrastructure architecture specification.

19. The computer program product of claim 14, wherein the generating further comprises presenting the infrastructure architecture specification to a user and modifying infrastructure architecture specification in response to user-supplied input and submitting the infrastructure architecture specification as modified to the infrastructure provider.

20. The computer program product of claim 14, wherein the program instructions are executable by the processor to cause the processor to initiate operations further comprising generating feedback based on user-supplied input and updating at least one of the first neural network, the second neural network, the third neural network, and the fourth neural network based on the feedback.

* * * * *